United States Patent
Kallam et al.

(10) Patent No.: US 12,045,645 B2
(45) Date of Patent: Jul. 23, 2024

(54) MULTI-THREAD WIRELESS COMMUNICATIONS PROCESSOR WITH GRANULAR THREAD PROCESSES

(71) Applicant: Silicon Laboratories Inc., Austin, TX (US)

(72) Inventors: Subba Reddy Kallam, Sunnyvale, CA (US); Partha Sarathy Murali, Sunnyvale, CA (US); Venkat Mattela, San Jose, CA (US); Venkata Siva Prasad Pulagam, Secunderabad (IN)

(73) Assignee: Silicon Laboratories Inc., Austin, TX (US)

( * ) Notice: Subject to any disclaimer, the term of this patent is extended or adjusted under 35 U.S.C. 154(b) by 1026 days.

(21) Appl. No.: 16/945,871

(22) Filed: Aug. 2, 2020

(65) Prior Publication Data

US 2021/0073027 A1 Mar. 11, 2021

Related U.S. Application Data

(60) Provisional application No. 62/899,078, filed on Sep. 11, 2019.

(51) Int. Cl.
*G06F 9/48* (2006.01)
*G06F 9/30* (2018.01)
(Continued)

(52) U.S. Cl.
CPC ........ *G06F 9/4812* (2013.01); *G06F 9/30101* (2013.01); *G06F 9/3822* (2013.01);
(Continued)

(58) Field of Classification Search
None
See application file for complete search history.

(56) References Cited

U.S. PATENT DOCUMENTS 11,200,058 B2 * 12/2021 Venkumahanti .... G06F 9/30098
2002/0103990 A1 * 8/2002 Potash ................. G06F 9/3009
712/23

(Continued)

FOREIGN PATENT DOCUMENTS

CN 108494771 A * 9/2018 ............. H04L 63/02

OTHER PUBLICATIONS

Malaysian Journal of Computer Science, vol. 16 No. 2, Dec. 2003, pp. 21-37, K Ettikan and Rosni Abdullah.
(Continued)

*Primary Examiner* — Noel R Beharry
*Assistant Examiner* — Angelie T Ngo
(74) *Attorney, Agent, or Firm* — File-EE-Patents.com; Jay A. Chesavage

(57) ABSTRACT

A communication processor is operative to adapt the thread allocation to communications processes handled by a multi-thread processor on an instruction by instruction basis. A thread map register controls the allocation of each processor cycle to a particular thread, and the thread map register is
(Continued)

reprogrammed as the network process loads for a plurality of communications processors such as WLAN, Bluetooth, Zigbee, or LTE have load requirements which increase or decrease. A thread management process may dynamically allocate processor cycles to each respective process during times of activity for each associated communications process.

21 Claims, 4 Drawing Sheets

(51) Int. Cl.
*G06F 9/38* (2018.01)
*G06F 9/50* (2006.01)
*H04L 49/90* (2022.01)
*H04L 65/60* (2022.01)
*H04W 4/80* (2018.01)
*H04W 12/06* (2021.01)
*H04W 80/02* (2009.01)
*H04W 80/04* (2009.01)

(52) U.S. Cl.
CPC .......... *G06F 9/3836* (2013.01); *G06F 9/5061* (2013.01); *H04L 49/90* (2013.01); *H04L 65/60* (2013.01); *H04W 4/80* (2018.02); *H04W 12/06* (2013.01); *H04W 80/02* (2013.01); *H04W 80/04* (2013.01)

(56) References Cited

U.S. PATENT DOCUMENTS

| | | |
|---|---|---|
| 2003/0037228 A1 | 2/2003 | Kelsey et al. |
| 2005/0033889 A1 | 2/2005 | Hass et al. |
| 2007/0204137 A1* | 8/2007 | Tran ..................... G06F 9/3861 |
| | | 712/E9.035 |
| 2017/0064051 A1* | 3/2017 | Steinmacher-Burow .................... |
| | | H04L 69/324 |

OTHER PUBLICATIONS

Wikipedia: Barrell Processor, Jul. 23, 2020, pp. 1-3.
Wikipedia: Multithreading (computer architecture), Sep. 29, 2020, pp. 1-4.
Wikipedia: Real-time computing, Oct. 20, 2020, pp. 1-6.
Wikipedia: Round-robin scheduling, Nov. 7, 2020, pp. 1-4.
Wikipedia: Scheduling (computing), Oct. 20, 2020, pp. 1-12.
Wikipedia: Weighted Round Robin, Oct. 21, 2020, pp. 1-7.

* cited by examiner

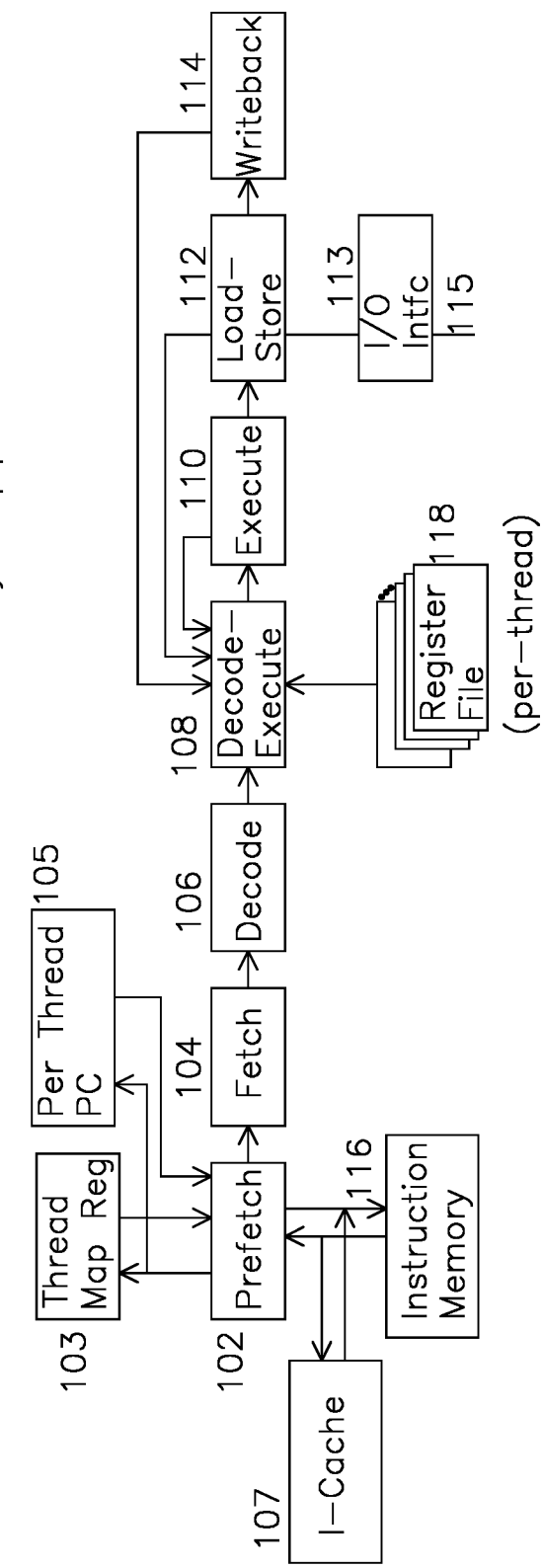
Figure 1
Thread Granularity in pipeline architecture
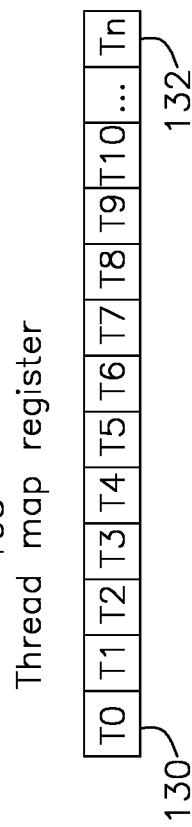
Figure 1A
per-thread Program Counters
Figure 1B
Thread map register

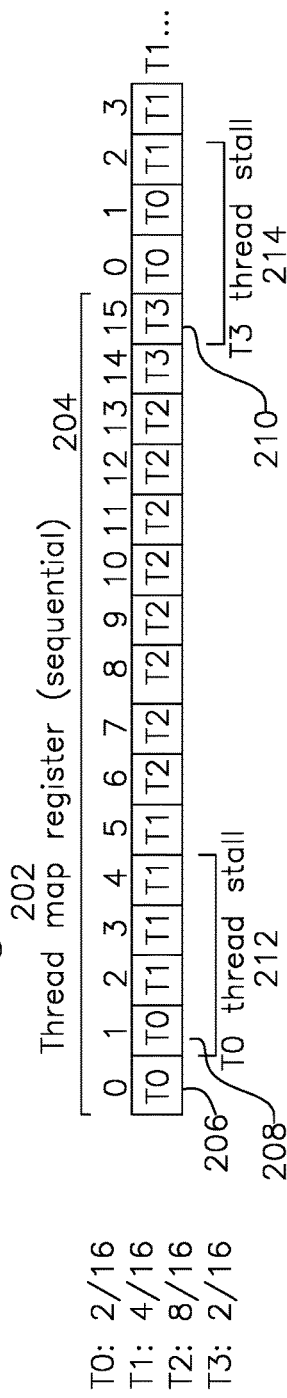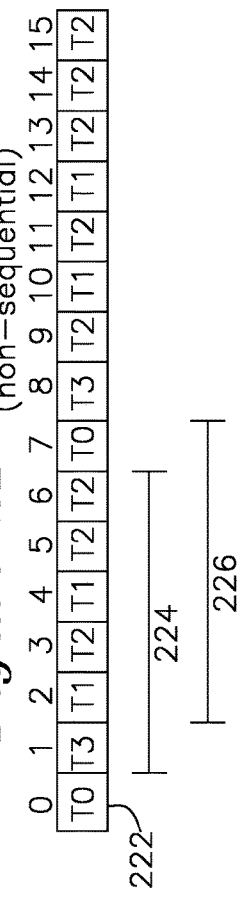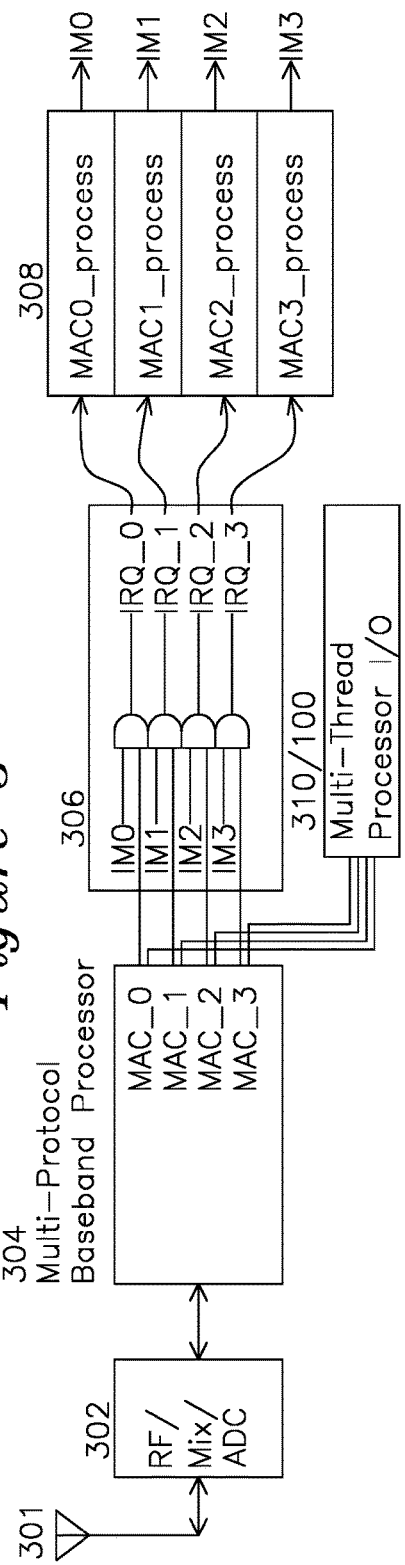

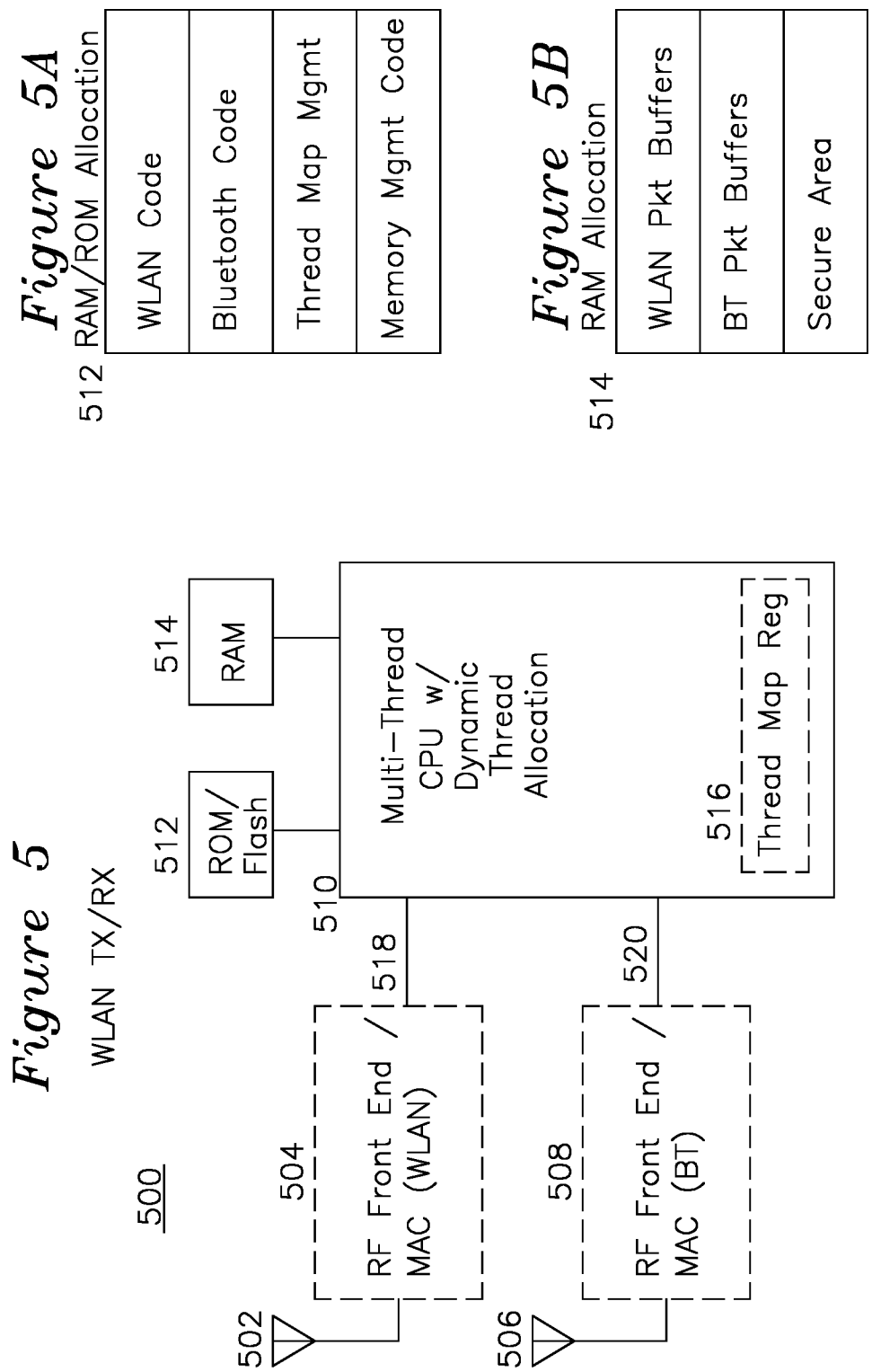

MULTI-THREAD WIRELESS COMMUNICATIONS PROCESSOR WITH GRANULAR THREAD PROCESSES

The present patent application claims priority to U.S. provisional patent application Ser. No. 62/899,078 filed Sep. 11, 2019.

FIELD OF THE INVENTION

The present invention relates to a multi-threaded processor. More specifically, the invention relates to a multi-threaded processor with the characteristic of granular and dynamic thread allocation such that each thread may be dynamically allotted a variable percentage of Central Processing Unit (CPU) processing capacity.

BACKGROUND OF THE INVENTION

Multi-threaded processors are utilized when a system is running multiple processes, each operative in its own separate thread. Examples of prior art multi-threaded processors and uses are described in U.S. Pat. Nos. 7,761,688, 7,657,683, and 8,396,063. In a typical application program operative for wireless communications using an example dedicated two thread processor, the processor alternates execution cycles between execution of instructions for a high priority program on a first thread and lower priority programs on a second thread, and the alternating execution results in an allocation of 50% of CPU processing capacity to each thread. Additionally, the allocation of CPU bandwidth to each thread is protected, in that during a thread stall, such as when a first thread accesses an external peripheral and must wait for data to return, the second thread may continue execution unaffected by the stall of the first thread.

A problem arises where the multi-threaded processor needs to allocate bandwidth unequally, or the allocation needs to be dynamically changed. It is desired to provide dynamic allocation of thread utilization to each task, such that during each interval comprised of a group of processor execution cycles, each of the threads during the interval receives a fixed percentage of CPU cycles. During subsequent intervals, additional threads may be added or removed, or the allocation of percentage of CPU cycles to each thread may be changed. It is also desirable to provide unequal allocation of CPU capacity across several threads, and for the allocation to be dynamically performed.

Another problem in multi-thread processors is the timely handling of interrupts. During interrupt handling, new interrupts are disabled so that the handling of a particular previous interrupt may complete. Subsequently received interrupts are not recognized until the previous interrupt handling is completed and interrupts are unmasked. It is desired to provide interrupt handling which timely recognizes new interrupts which arrive during the pendency of task handling of a previous interrupt.

OBJECTS OF THE INVENTION

A first object of the invention is a multi-thread superscalar processor having a series of cascaded stages, each cascaded stage providing the results of an operation to a successive stage, the first of the cascaded stages receiving an instruction from a program memory address referenced by thread identifier and associated program counter, the thread identifier provided by a thread map register containing a sequence of thread identifiers, each thread identifier indicating which of a program counter and register file is to be used by a particular processor stage, the particular instruction selected using the thread identifier and per thread program counter provided to a sequence of pipelined stage comprising an instruction fetch stage, instruction decode stage, decode/execute stage, execute stage, load/store stage, and writeback stage, the decode/execute stage coupled to the register file selected by thread identifier.

A second object of the invention is a multi-thread superscalar processor operative to handle a plurality of interrupt processes, each interrupt process associated to a particular thread.

A third object of the invention is a multi-thread superscalar processor having a thread map register which is re-programmable to dynamically identify a sequence of threads to be executed, each thread associated with a program counter register and a register file, the program counter register and register file coupled to at least one of the sequential stages: a prefetch stage, an instruction fetch stage, an instruction decode stage, a decode/execute stage, an execute stage, a load-store stage, and an optional writeback stage.

A fourth object of the invention is the dynamic allocation of thread bandwidth from a first protocol process to a second protocol process, each protocol process handling packet arriving through separate interfaces and handled by different threads in a multi-threaded processor with granular control of the allocation of cycles to each thread.

A fifth object of the invention is a communications interface having concurrent processing of unrelated communications protocols such as Bluetooth and WLAN, the Bluetooth interface active during regular intervals of time separated by gaps of Bluetooth protocol inactivity, the gaps of Bluetooth protocol inactivity used for WLAN communications, the communications protocols operative on a multi-thread processor providing dynamic assignment of a greater number of thread cycles to the Bluetooth protocol during active Bluetooth intervals, and providing dynamic assignment of a greater number of thread cycles to the WLAN protocol during active WLAN intervals.

SUMMARY OF THE INVENTION

In one example of the invention, a superscalar processor has, in sequence, a pre-fetch stage, a fetch stage, a decode stage, a decode/execute stage, an execute stage, a load/store stage, and an optional writeback stage. The pre-fetch stage receives an instruction which is provided by a per-thread program counter under the direction of a thread map register, which provides a canonical succession of thread identifiers which index into the per-thread program counter to select the identified thread, and the selected program counter directs the pre-fetch stage to receive the instruction from the instruction memory. The decode/execute stage is coupled to a register file which selects the register file associated with the thread being executed by the decode/execute stage at that time so that the thread-specific register set is addressed.

The thread map register identifies the particular thread being executed, where the thread map register may refer to any number of different threads, subject to the limit of the number of per-thread program counters and per-thread register files. For example, the thread map register may contain 10 entries, and the number of per-thread program counters and per-thread register files may be 4. In this case, the granularity of each of the 4 threads may be specified to 10%, such that thread_0 may receive 1 cycle, thread_1 may receive 4 cycles, thread_2 may receive 3 cycles, and thread 3 may receive 2 cycles. The thread register, without limit, may specify any of [0,1,1,1,1,2,2,2,3,3], which are canonically executed. The thread register may be updated to change thread numbers or allocation of threads, for example, thread 0 may be expanded and thread 1 reduced, such as by writing the new values [0,0,0,0,1,2,2,2,3,3] to the thread register.

In another example of the invention, interrupt masking is provided per-thread on the superscalar multi-thread processor, such that each thread has its own separate interrupt register. In this example of the invention, each thread has its own separate interrupt processing, such that an interrupt to thread_0 is masked by thread_0 and other threads such as thread_1, thread_2, . . . , thread_n continue execution, each with the ability to separately handle interrupts directed to each respective thread. In this example architecture, each thread may be able to handle a different protocol type, for example, each of the wireless protocols WLAN, Bluetooth, and Zigbee packet handling could be handled with the packet buffers coupled to processor interfaces of a multi-protocol baseband processor with a common packet buffer interface. In this example, the multi-thread processor may handle acknowledgement and retransmission requests, each of which must be completed in a timely manner using interrupt processing, each protocol type on a separate interrupt dedicated to a separate thread, and the thread register being re-written as needed to allocate greater thread cycles on an adaptive basis.

BRIEF DESCRIPTION OF THE DRAWINGS

FIG. 1 shows a block diagram for a multi-thread superscalar processor having a per-thread program counter and per-thread register file.

FIG. 1A shows a block diagram for the organization of the per-thread program counters.

FIG. 1B shows a block diagram for an example of the thread map register.

FIG. 2A shows a thread map register for an example of the thread map register for a sequential mapping of threads and a given thread allocation.

FIG. 2B shows a thread map register for a non-sequential mapping of threads of FIG. 2A.

FIG. 3 shows per-thread interrupt controller and handling for the multi-thread processor of FIG. 1.

FIG. 5 shows a block diagram of a Bluetooth and WLAN processor using a multi-thread processor.

FIG. 5A shows an example allocation of program code and associated tasks for a multi-thread processor.

FIG. 5B shows an example allocation of RAM for packet buffers.

DETAILED DESCRIPTION OF THE INVENTION

Figure 4:
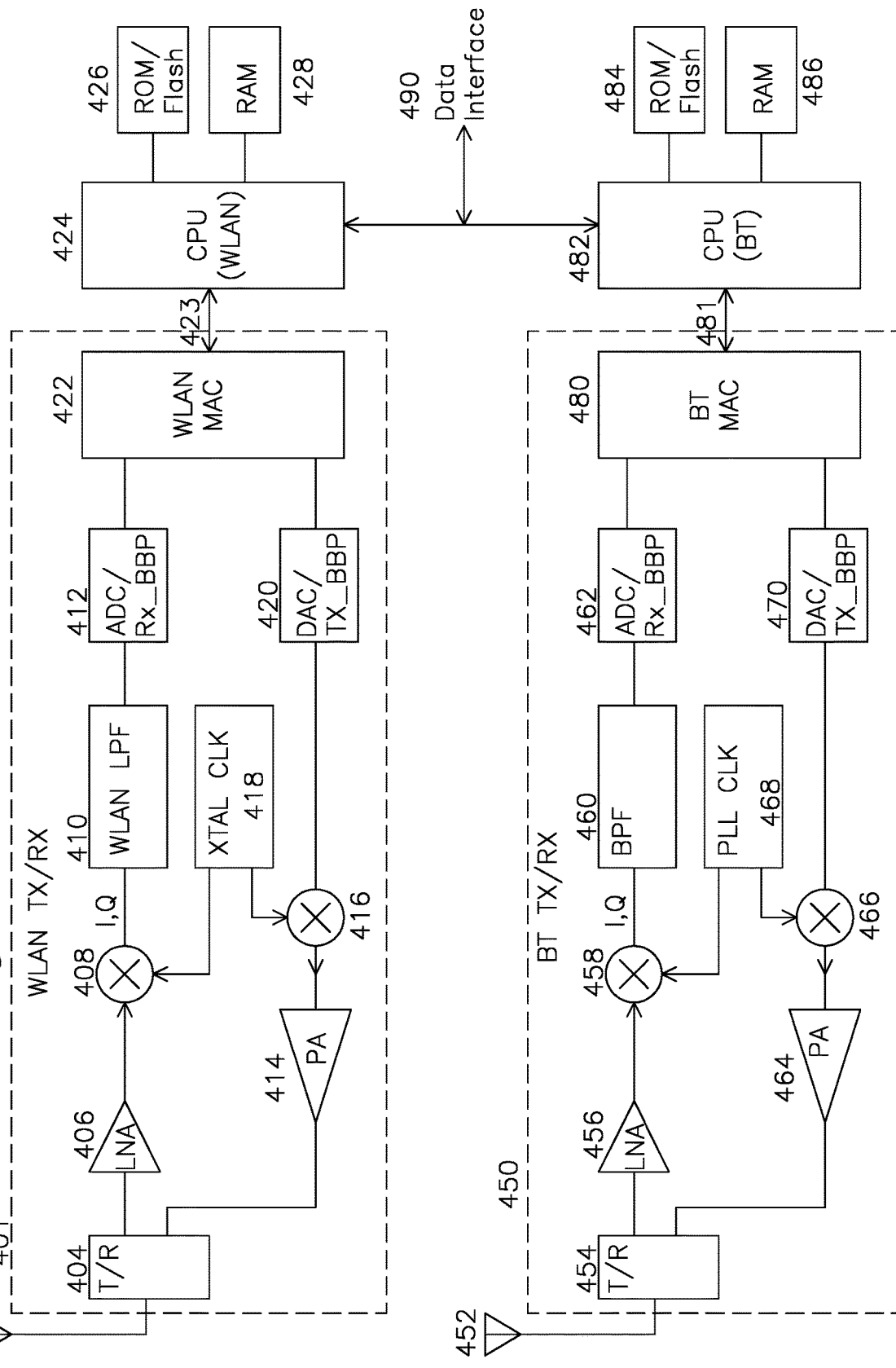
FIG. 4 shows a block diagram of a Bluetooth and WLAN processor using separate CPUs.

FIG. 1 shows an example of the invention for a superscalar processor 100 having the sequential stages: pre-fetch stage 102, fetch stage 104, decode stage 106, decode/execute stage 108, execute stage 110, load/store stage 112, and optional writeback stage 114. An instruction which is delivered to pre-fetch stage 102 is sequentially executed by each subsequent stage on separate clock cycles, carrying forward any context and intermediate results required for the following stage. In one example of the invention, a thread map register 103 provides a canonical sequence of thread identifier (thread_id) for delivery to the per-thread program counter 105, which provides the associated current program counter 105 address to prefetch stage 102, which retrieves the associated instruction from instruction memory 116 and delivers it to fetch stage 104 on a subsequent clock cycle. The decode/execute stage 108 is coupled to per-thread register file 118, which is responsive to read requests from decode/execute stage 108, or writeback operations from stage 114, each of which are thread-specific, so the data read or written to the register file 118 corresponds to the thread_id which is requesting or providing it.

FIG. 1A shows a plurality of per-thread program counters 105 PC_T0 for thread_0, PC_T1 for thread_1, . . . , PC_Tn for thread_n, one program counter operative for use with each thread.

FIG. 1B shows the thread map register 103, which comprises a sequence of thread identifiers T0 130 to Tn 132 executed canonically. The number of threads (each thread being a separate process executing in a CPU cycle of a particular stage) is m, limited by the number of register files 118 and program counters 105, whereas the thread map register 103 may support m threads for equal allocation of CPU bandwidth to thread, or for greater granularity of thread control, may provide n timeslots, where n>m. For example, a thread map with 16 entries may support 4 threads, each thread having granularity of 1/16 of the available CPU processing capacity and supporting anywhere from 0/16 to 16/16 of the available CPU processing capacity, subject to allocation of CPU processing capacity to the remaining threads.

FIG. 2A shows an example 16 entry thread map register 103 over canonical cycle length 204, the thread map register canonically repeating at the end of each 16 entries. The present example of FIG. 2A is shown for 4 threads and sequential mapping, which may be suitable for applications without thread stalls, the case where a thread is unable to execute sequential cycles because of a delay in receiving a result from an external resource, for example. For n=16 thread map register positions, the thread map register provides 1/16th resolution of processor application to each task, and the processor can be used with one thread per thread map register location, however this provides a fixed allocation of time to each thread. In a preferred utilization, the number of thread identifiers m is smaller than the number of thread map register locations n, which provides that the allocation of a particular thread to a task may have the granularity p/n, where n is typically fixed and p is programmable as the number of cycles allocated to a particular thread, and can be varied from 0 to n to allocate more or less computational resource to each thread. In another example of the invention, the length n of the thread map register may be itself programmable to provide greater granularity in task cycle management, or to support a greater number of threads.

FIG. 2A shows an example thread map register for a four thread processor in a 16 position thread map register 202, with threads 0, 1, 2, and 3 (T0, T1, T2, T3, respectively), and processor capacity allocated to 12.5%, 25%, 50%, and 12.5%, to each respective thread. A problem arises where a particular thread must wait for an external resource to respond, known as a thread stall. In the example of FIG. 2A, the decode/execute stage 108 may require reading an external shared memory or media access controller (MAC) not shown, and the delay in reading the external resource may require 4 clock cycles. In the case where the thread allocation is shown in FIG. 2A and the threads accessing an external resource are T0 and T3, or are otherwise subject to delays in reading or writing devices, T0 will be in a thread stall at operation 208, and T3 will be in a thread stall 214 at cycle 210. With the arrangement of thread identifiers shown in FIG. 2A, this will result in loss of an otherwise available CPU cycle for each thread stall.

FIG. 2B shows an alternative mapping which uses the same time allocation of FIG. 2A, but with the thread sequence 220 rearranged for the same thread stall case as was shown in FIG. 2A. The rearrangement of T0 to positions 0 and 7, and rearrangement of T3 to positions 1 and 8, is reflected in the arrangement of FIG. 2B. The T0 thread is only stalled for thread stalls longer than 6 clock cycles 224, whereas the thread stall 212 is 4 clock cycles, so both occurrences of T0 are executed with the arrangement of FIG. 2B, rather than one in FIG. 2A. Similarly, the T3 stall which causes the second T3 cycle of FIG. 2A to be deferred does not occur in FIG. 2B unless the thread stall has duration 226.

FIG. 3 shows another aspect of the invention, an example for wireless signal processing where process threads 308 are executable as different threads on the multi-thread processor of FIG. 1, and the multi-thread processor has interfaces 310 which are part of multi-threaded CPU 100, each interface associated with a particular MAC. Wireless signals are received and transmitted on antenna 301, converted to baseband on receive or modulated to RF on transmit by 302, and provided to multi-protocol baseband processor 304. When a packet arrives for a particular interface of the multi-protocol MAC, an interrupt for a particular thread may be sent to the interrupt controller 306, where each interrupt is maskable by an associated process 308 operative in the multi-protocol processor. Each process is able to control an associated interrupt mask (shown as IM0, IM1, IM2, IM3), which are provided to interrupt controller 306 to mask an interrupt such that a new interrupt is not processed by an associated process until the previous interrupt for that process has completed.

The present multi-task handling of interrupts has specific advantages over the prior art. In the prior art, an interrupt service routine on thread 0 may be handling packet acknowledgement for multiple packet interfaces. In this task, after receipt of a packet, the receive buffer is examined to detect any missing packets in the sequence, and the process either acknowledges the received packets, or makes a retransmission request to the sender for any missing packets. There is a critical timing window associated with packet acknowledgement and retransmission, so it is important that either an acknowledgement or a retransmission request be timely made after receipt of a packet. We may consider the case where a retransmission request must be made within 30 us of receipt of a packet, and a first retransmission task 0 requires 5 us to complete, a second retransmission task 1 requires 10 us to process and complete, and a third retransmission task 3 requires 5 us to process and complete, and a single process is handling the three tasks on a single thread. In this example where three tasks are handled by a common thread, and a common interrupt mask is used as in the prior art, a process handling task 0 on thread 0 upon receipt of a packet masks interrupts to prevent other packet acknowledgements from slowing the handling of the present acknowledgment, requiring 5 us. If a second interrupt associated with task 1 for thread 0 arrives during the handling of task 0, task 1 does not get handled until at least 5 us after its arrival because thread 0 is still busy with task 0. It may further occur because of a burst of packets on different interfaces that while task 1 (requiring 10 us) is waiting for task 0 (requiring 5 us) to complete, a third task 3 requiring 5 us to complete may arrive. When task 0 completes, the interrupt mask is removed, task 1 generates an interrupt and is detected, the interrupt mask is again asserted, and processing of task 1 completes, after which the interrupt mask is cleared and task 2 is detected by assertion of its interrupt. Thereafter, the interrupt mask is again asserted, task 2 starts as late as least 15 us after arrival of the request, and the request complete at 20 us, after the required retransmission request window has passed. The interrupt mask is cleared after completion of task 2, however the retransmission request from task 2 was not timely received by the remote station and the retransmission protocol has failed. The prior art solution to the problem of latency delay of task 2 after handling of earlier tasks 1 and 2 is a faster processor. Additionally, while the multi-core processor is reading the MAC interface, thread lock may occur which may be avoided by the rearrangement of thread identifiers as previously shown in FIG. 2B. In this case, a small allocation of thread cycles to the acknowledgement and retransmission task may be required, but spreading the three tasks to separate threads, each with a small allocation of time, will overcome both the interface read/write latency, and also the latency delay in interrupt mask by having each thread associated with a separate interrupt and interrupt mask.

In the prior art, where each of the tasks execute on a single thread and each task required 50 MIPS, because of latency and delay in handling the interrupts sequentially, 300 MIPS of processing capacity is required to successfully handle the three tasks, whereas with the novel approach of FIG. 3, only approximately 150 MIPS is required, thereby saving a factor of two in MIPS requirement, resulting in a reduced power consumption requirement.

In another example of the multi-protocol processor of FIG. 1, each of the wireless protocols may be handled by a separate thread. For example, the processes handling WLAN, Bluetooth, and Zigbee may each be operative on a separate process on its own thread, and the retransmission processes for each may be handled by separate processes for each protocol, each operative on its own thread.

In another example of the invention, the thread map register may be interactively changed according to process demands detected by a separate thread management process. Since the context from each stage is forwarded to a subsequent stage of FIG. 1, changes to the thread map register may be done at any time, subject to synchronous clocking requirements for the prefetch stage 102 to receive a deterministic thread_ID and the associated per-thread program counter 105.

FIG. 4 shows an example wireless local area network (WLAN) and Bluetooth (BT) combination transceiver with an interface 480 for exchanging data with a communication system. Because of the specialized WLAN and BT processing operations required by each protocol and the timeliness of response required by each, a CPU is required for each interface type. The requirement for low-latency processing by a CPU for each interface results in the WLAN and BT processing performed by a system architecture such as the one shown in FIG. 4.

FIG. 4 shows a WLAN processor comprising analog front end and MAC 401 are coupled to a WLAN CPU 424, and a BT process comprising analog front end and MAC 450 are coupled to a BT CPU 482. Each WLAN CPU 424 and BT CPU 482 are able to timely respond to interrupts and burst of events requiring immediate processing by software programs associated with each respective WLAN processor 401 and BT processor 450.

In the WLAN processor 401, antenna 402 is coupled to a transmit/receive switch 404 for coupling receive signals to low noise amplifier 406 and transmit signals from power amplifier 414. Input signals are mixed 408 to baseband using a clock source 418, low pass filtered 410, and the analog baseband signal is digitized and processed with combined ADC and baseband processor 412 which demodulates the received symbols into a data stream which is formed into layer 2 packets by Media Access Controller (MAC) 422 across an interface such as Serial Data Interface (SDI) to CPU 424. CPU 424 has an associated Random Access Memory (RAM) 428 for storage of packets received and packets to be transmitted, program code executed by the CPU 424, and other non-persistent information when the system is powered down. Read Only Memory (ROM) or Flash memory 426 is used for storing program instructions which are typically downloaded from Flash/ROM to RAM during a power-up sequence. The MAC 422 receives data to transmit over an interface 423 such as Serial Data Interface (SDI), and provides received data packets to the CPU 424 along with sequence number, so that the CPU 424 can detect and manage retransmission of any missing data, as well as set up any WLAN authentication protocols, perform any required per-packet operations such as encapsulation and decapsulation, channel management, packet aggregation, and connection management and authentication.

FIG. 4B shows an example Bluetooth processor 450 comprising analog front and BT MAC, which similarly operates with antenna 452, transmit/receive switch 454, low noise amplifier 456, mixer 458, band pass filter 460, and analog/digital converter and baseband processor 462 which is operative to convert baseband Bluetooth frequency hopping patterns into data streams, as ADC/Baseband processor 412 does for WLAN 802.11 packets. The Bluetooth transmit chain includes baseband processor and DAC 470, mixer 466 which modulates the baseband frequency hopping stream to an RF carrier frequency using modulation clock source 468, and power amplifier 464 which couples modulated Bluetooth frequency hopping stream to transmit/receive switch 454. The BT CPU handles the various connection management including pairing.

The WLAN MAC 422 is coupled to WLAN CPU 424 via digital interface 423 such as Serial Peripheral Interface (SPI), and BT MAC 480 is coupled to BT CPU 482 via digital interface 481. The architecture of FIG. 4 thereby provides separate CPU processing power for each of the WLAN and Bluetooth processes operating on each, including low latency for processing connection or packet requests from each interface.

FIG. 5 shows an alternative architecture to FIG. 4, where a WLAN RF Front End/MAC 504 (corresponding to the processing of FIG. 4 401) and BT RF Front End/MAC 508 (corresponding to the processing of FIG. 4 450) are coupled via respective digital interfaces 518 and 520 to multi-thread CPU 510, which itself is coupled to ROM/Flash 512 and RAM 514. Optionally, thread map register 516 is present which provides allocation of CPU cycles to either Bluetooth or WLAN processes. In one example of the invention, the number of process_id entries in the thread map register is fixed, and an increased or decreased number of thread_id values may appear in the thread map register to provide an increased or decreased number of process cycles to particular process associated with each thread_id. For a pipelined multi-thread processor receiving one instruction at a time as previously described, the multi-thread processor receiving each instruction for a thread determined by the thread map register which is issuing a next thread_id for each instruction, the granularity of control over thread process allocation is instruction by instruction. Since the thread map register issues thread_ids in a repetitive canonical manner, the allocation of process to thread has very fine granularity equal to the reciprocal of the number of values the thread map register may support. In one example of the invention, a thread management process may operate as one of the processes having a unique thread_id, the thread management process examining the activity in other threads to increase or decrease the number of entries of a corresponding thread_id according to the activity level and to assign and deallocate thread_id values from the thread map register. The activity level for a communication process associated with a communication processor may be determined by the number of packets transmitted or received by the associated communication processor and handled by that thread, for example, and a threshold may be established to indicate when more or fewer thread_id values for that particular thread is present in the thread map register. Examples of process threads with unique thread_ids having greater or fewer entries dynamically placed in the thread map register by a thread management process include link layer processes, network layer processes, or application layer processes, where each link layer, network layer, or application layer process may include a plurality of processes with unique threshold metrics, each of these processes associated with a particular communication processor such as 401, 450, 504, or 508. The increased allocation of thread_ids in the thread map register may be done for the duration of time that the threshold metric (such as packet data rate, number of packets remaining to be processed, a thread load metric, or a percentage of thread process task completion) exceeds a threshold.

FIG. 5A shows allocation of memory (either ROM/Flash 512 or RAM 514) to the various threads which are present. One thread may be WLAN code, corresponding to the tasks performed by FIG. 4 WLAN CPU 424, and another thread may be BT code, corresponding to the tasks performed by FIG. 4 BT CPU 482. An additional thread may be assigned to manage the thread map register, thereby controlling the allocation of bandwidth of various tasks to thread map register 103 previously described, and an additional task may perform memory management of the packet buffers and other low-priority infrequently performed functions. The thread map management task may periodically examine the utilization of the BT and WLAN interface, and change the allocation of CPU cycles to each task according to demand. In one aspect of the invention, the Bluetooth and WLAN operations are performed exclusively, and the CPU thread allocation for the interfaces (the BT and WLAN tasks of FIG. 5A) are dedicated to one interface or the other.

In another example of the invention, the various threads may handle different parts of a particular communications protocol. For example, one thread may handle layer 2 and other operations, and the other thread may handle layer 3 and application aspects of a particular protocol. In one aspect of the invention for any of the WLAN protocols, one thread may handle basic communications aspects which may be collectively referred to as lower MAC functions. The lower MAC functions for WLAN and Bluetooth include packet sending, packet receiving, clear channel assessment (CCA), inter frame spacing, rate control, request to send and clear to send (RTS/CTS) exchanges, wireless packet acknowledgments DATA/ACK for WLAN and Bluetooth, or channel hopping specific to Bluetooth. Upper MAC functions perform other ISO (International Standards Organization) layer 2 functions at the data link layer not performed by the lower MAC functions. Upper MAC functions in the present specification collectively refer to any of: the WLAN supplicant (any protocol associated with joining or logging into a wireless network access point), WLAN packet retransmissions and acknowledgements, security functions such as those described in the standards WPA or WPA2 (Wireless Protected Access). ISO layer 3 (network layer) functions may be performed by a separate thread. Layer 3 functions include IP packet formation, TCP retransmissions and acknowledgements, SSL encryption and connection management, and application layer operations, such as packet encapsulation for a particular application layer process. In another example of the invention for Bluetooth, one of the threads may be assigned to handle the Bluetooth controller, stack, retry and acknowledgements, and the other thread may be assigned to handle application layer tasks. In this manner, the two tasks for a particular protocol are separated and provided to the separate threads, and may use a common interface such as SRAM for communication of data from one thread to the other.

In certain applications, WLAN communications and Bluetooth communications may co-exist and operate concurrently. In this example configuration, it is possible to dynamically allocate the CPU thread cycles to WLAN communication processes when a WLAN packet is being processed, and to BT thread cycles when a Bluetooth packet is being processed. A plurality of processes which are associated with a particular communication processor 401, 450, 504, or 508 may be created with unique thread_id values, each thread_id placed into the thread map register 516 to provide processing bandwidth for each associated process, and these processes exited and the thread_id removed from the thread map register 516 when the associated communication processor is not enabled. Concurrent communications may be performed by relying on the regular communication intervals of Bluetooth communications where packets are transmitted in regular slot intervals, and may be separated in time by large time intervals where the channel is not being used for BT communications. During these intervals, WLAN packets may be transmitted and acknowledged, so as to not interfere with BT communication windows. The thread map register 103 may be dynamically changed to provide a greater percentage of CPU capacity to BT during Bluetooth packet intervals, and then to WLAN during WLAN packet intervals, thereby reducing power consumption over the architecture of FIG. 4.

The examples shown in FIGS. 4 and 5 are for the particular disparate communications protocols of WLAN and Bluetooth, but it is understood that these are for illustration purposes only. Disparate communication protocols are sets of communication protocols which require entirely different packet handling. Examples are any of Bluetooth, WLAN, Zigbee, Near Field communications, others are known to those skilled in the art of communications protocols.

We claim:

1. A communications system for dynamic allocation of thread processes for wireless communications, the communications system comprising:
    a plurality of communication processors, each communication processor operative to receive and/or transmit wireless packets;
    a multi-thread processor operative to execute a plurality of thread processes comprising instructions, each thread process having a unique thread_id, the multi-thread processor also having a programmable thread map register indicating which thread_id is next to be executed by the multi-thread processor on an instruction by instruction basis;
    the thread map register having a number of entries arranged in a canonical linear array, the number of entries greater than a number of unique thread_ids;
    a thread process assigning a plurality of communication threads for each communication processor to the thread map register, each communication thread having a unique thread_id and associated with at least one of a link layer process or a network layer process; and,
    where at least one communication processor of the plurality of communication processors has a security function performed by a security thread process having an associated unique thread_id, the number of security function thread_id values in the thread map register being increased during the security function.

2. The communications system of claim 1 where at least one communication processor has a media access controller and an associated link layer communication process performing transmission and reception of packets, the at least one communication processor also having an associated network layer process performing network layer retransmission and acknowledgement of network layer packets.

3. The communication system of claim 2 where the link layer communication process is performed by a first process thread with a unique thread_id and the network layer process is performed by a different process with a unique thread_id different than the thread_id for the first process thread.

4. The communications system of claim 3 where a number of first process thread_id values in the thread map register is increased and a number of second process thread_id in the thread_map_register is increased when a number of packets transmitted or received by an associated at least one communication processor increases from a previous value.

5. The communications system of claim 1 where the security function is an authentication.

6. The communications system of claim 1 where at least one communication processor is operative to transmit and receive Bluetooth packets.

7. The communications system of claim 1 where at least one communication processor comprises a media access controller (MAC), and one process thread associated with the MAC handles at least one lower MAC function, and a different process thread associated with the MAC handles at least one upper MAC function.

8. The communications system of claim 7 where information from the process thread handling the at least one lower MAC function and the process thread handling the at least one upper MAC function share data in a random access memory associated with the multi-thread processor.

9. The communications system of claim 1 where one of the process threads is a thread management process which creates new thread process and assigns an associated thread_id to the thread map register.

10. The communications system of claim 9 where a new thread process is created when a communication processor is enabled for a wireless communication protocol.

11. A communications system for dynamic allocation of multi-thread processor bandwidth to associated wireless communication protocols, the communications system comprising:
    a plurality of communication processors operative to perform wireless communications, each of the communication processors having a data interface;
    a thread map register comprising a canonical list of thread_id entries;
    a multi-thread processor operative to execute a plurality of thread processes, each thread process having a unique thread_id, the execution performing a single instruction at a time based on the unique thread_id provided for each instruction by the thread map register;

where at least one communication processor of the plurality of communication processors has a security function performed by a security thread process having an associated unique thread_id, the number of security function thread_id values in the thread map register being increased during the security function;

the number of entries in the thread map register being greater than the number of unique thread_id values;

at least one management process thread increasing the number of thread_id values for a particular thread in the thread map register while a load metric of the process associated with the thread_id exceeds a threshold; and, where the management process thread configures the thread map register to contain a particular thread_id associated with a particular communication controller data interface having a thread stall response time, the particular thread_id arranged in the thread map register to be separated from a subsequent particular thread_id in the thread map register corresponding to a duration of time which is greater than the thread stall response time.

12. The communications system of claim 11 where at least one of the communication processors is operative for Wireless Local Area Network communications and at least one of the communications processor is operative for Bluetooth communications, each communication processor having an associated process handling lower MAC functions and an associated process handling upper MAC thread process.

13. The communications system of claim 11 where at least one of the threads performs a memory management process including allocating and deallocating packet buffer memory in a random access memory (RAM) accessible to the multi-thread processor.

14. The communications system of claim 11 where the thread load is determined by comparison to a percentage of thread process task completion.

15. The communications system of claim 11 where the threshold is a number of unprocessed packets handled by an associated process thread.

16. The communications system of claim 11 where the thread management process allocates a greater number of process_id values in the thread map register to a corresponding process associated with a first communication processor during a first interval, and allocates a greater number of process_id values in the thread map register to a corresponding process associated with a second communication processor during a second interval.

17. A thread management process operative on a wireless communications system having a plurality of communication processors supporting different wireless communication protocols and having a multi-thread processor operative to execute one instruction at a time from a process identified by a unique thread_id, the thread_id issued in sequence by a thread map register having a plurality of values greater than a number of unique thread_id values, the thread management process comprising:

identifying active communication processors and assigning at least one lower MAC thread process and at least one upper MAC thread process to each active communication processor;

identifying at least one thread process which requires additional multi-thread processor cycles and also identifying at least one thread process which requires fewer multi-thread processor cycles;

the thread management process modifying the thread map register to contain fewer instances of the thread_id associated with the at least one thread process which requires fewer multi-thread processor cycles and replacing a corresponding thread_id with a thread_id for at least one thread process which requires additional multi-thread processor cycles; and, where at least one communication processor of the plurality of communication processors has a security function performed by a security thread process having an associated unique thread_id, the number of security function thread_id values in the thread map register being increased during the security function.

18. The thread management process of claim 17 where at least one of the communication processors is operative for communication according to at least one of: a WLAN protocol, a Bluetooth protocol, an LTE protocol, a 3G protocol, or a Zigbee protocol.

19. The thread management process of claim 17 where the at least one lower MAC process is at least one of: packet sending, packet receiving, clear channel assessment (CCA), inter frame spacing, rate control, request to send and clear to send (RTS/CTS) exchanges, wireless packet acknowledgments DATA/ACK for WLAN and Bluetooth, or channel hopping.

20. The thread management process of claim 17 where the at least one upper MAC process is at least one of: a WLAN supplicant for joining or logging into a wireless network access point, a WLAN packet retransmission or acknowledgement, or a layer 2 security function.

21. The thread management process of claim 17 where a thread is assigned to a communication processor for handling network layer communications including network layer packet retransmissions and network layer packet acknowledgments.

* * * * *